United States Patent [19]

Markunas

[11] Patent Number: 4,591,317
[45] Date of Patent: May 27, 1986

[54] DUAL PUMP CONTROLS

[75] Inventor: Albert L. Markunas, Roscoe, Ill.

[73] Assignee: Sundstrand Corporation, Rockford, Ill.

[21] Appl. No.: 486,387

[22] Filed: Apr. 19, 1983

[51] Int. Cl.$^4$ .......................... F04B 49/08; F02C 9/18; G05D 7/00
[52] U.S. Cl. .................................... 417/288; 137/115; 417/303; 417/304; 417/310; 417/300
[58] Field of Search ............... 417/286, 287, 288, 299, 417/302, 303, 304, 310, 300; 137/88, 115; 60/39.281

[56] References Cited

U.S. PATENT DOCUMENTS

| | | | |
|---|---|---|---|
| 2,241,330 | 5/1941 | Shaw | 417/299 X |
| 2,665,637 | 1/1954 | Lauck | 103/4 |
| 2,780,172 | 2/1957 | Coar | 103/10 |
| 2,812,715 | 11/1957 | Redding et al. | 60/39.281 X |
| 2,835,323 | 5/1958 | Booth | 60/39.281 X |
| 2,898,737 | 8/1959 | Rockwell | 417/287 X |
| 3,033,232 | 5/1962 | Bahniuk | 137/622 |
| 3,953,153 | 4/1976 | Huber et al. | 417/204 |
| 4,102,606 | 7/1978 | Huber et al. | 417/204 |
| 4,245,964 | 1/1981 | Rannenberg | 417/288 X |
| 4,412,789 | 11/1983 | Ohe et al. | 417/288 |
| 4,445,818 | 5/1984 | Ohsaki et al. | 417/299 X |

FOREIGN PATENT DOCUMENTS 1246014 9/1960 France ................. 417/286

Primary Examiner—Carlton R. Croyle
Assistant Examiner—Theodore Olds
Attorney, Agent, or Firm—Wood, Dalton, Phillips, Mason & Rowe

[57] ABSTRACT

Controls for a dual element pump having first and second pumps with separate outputs wherein a modulating valve is positionable to control the amount of fuel delivered by a first pump to a fuel control and additionally to selectively control the utilization of flow delivered by the second pump. The flow from the second pump is bypassed when not needed through a pressure regulating valve having a minimal setting and with the setting of the pressure regulating valve being increased by operation of the modulating valve prior to the flow from the second pump being added to the flow from the first pump. The control of the modulating valve is by means of a flow control valve operating through dynamic compensator structure. The flow control valve is positioned by a head sensor including a jet pipe shiftable from a null position by a pressure differential signal delivered by two pressure sensing lines sensing a pressure differential across a variable area opening in a valve forming part of the fuel control. The foregoing structure operates to maintain a constant pressure differential at the fuel control by adjusting the rate of fuel delivery to the fuel control with a stepless transition between the utilization of one or two pumps.

21 Claims, 4 Drawing Figures

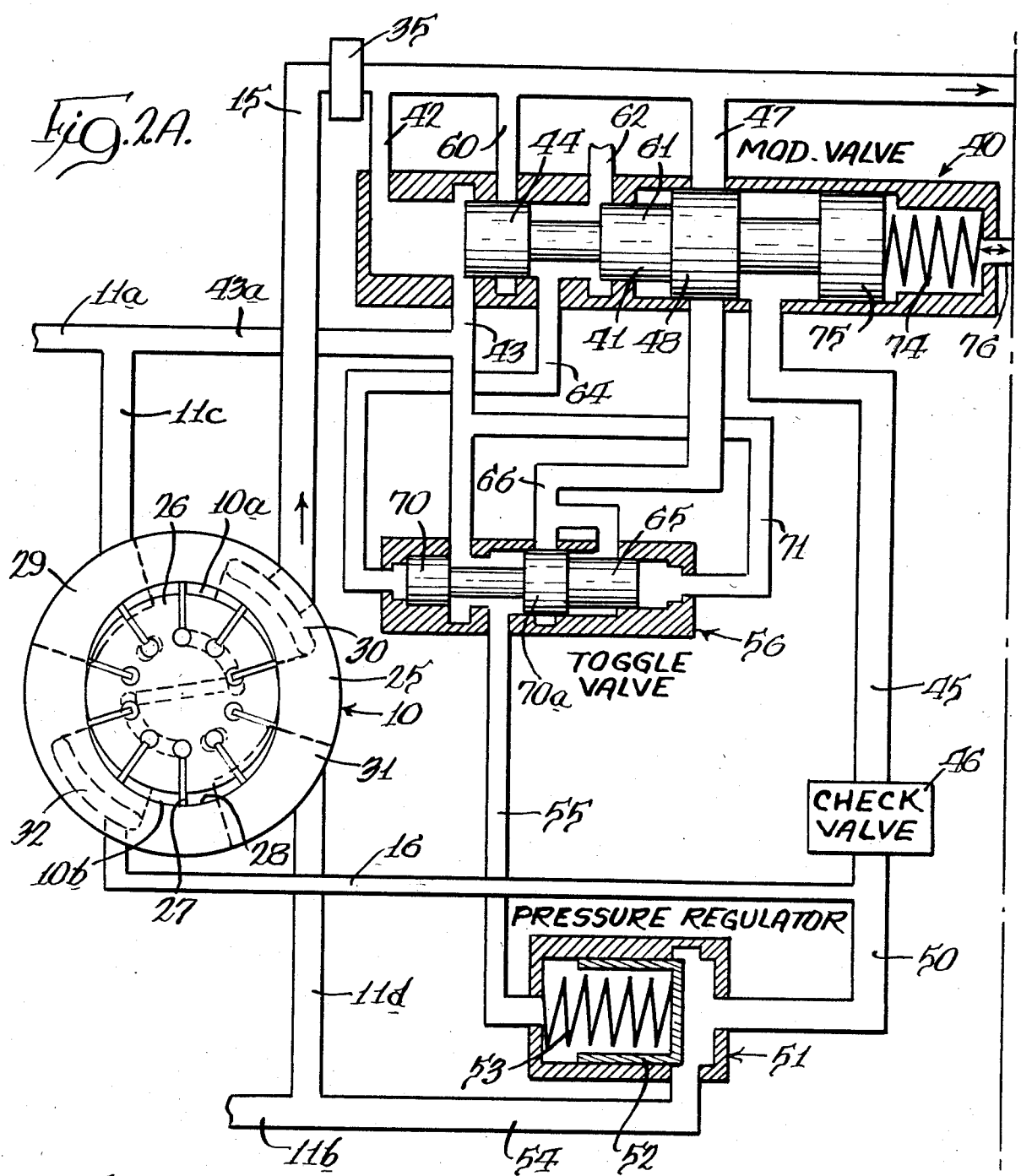

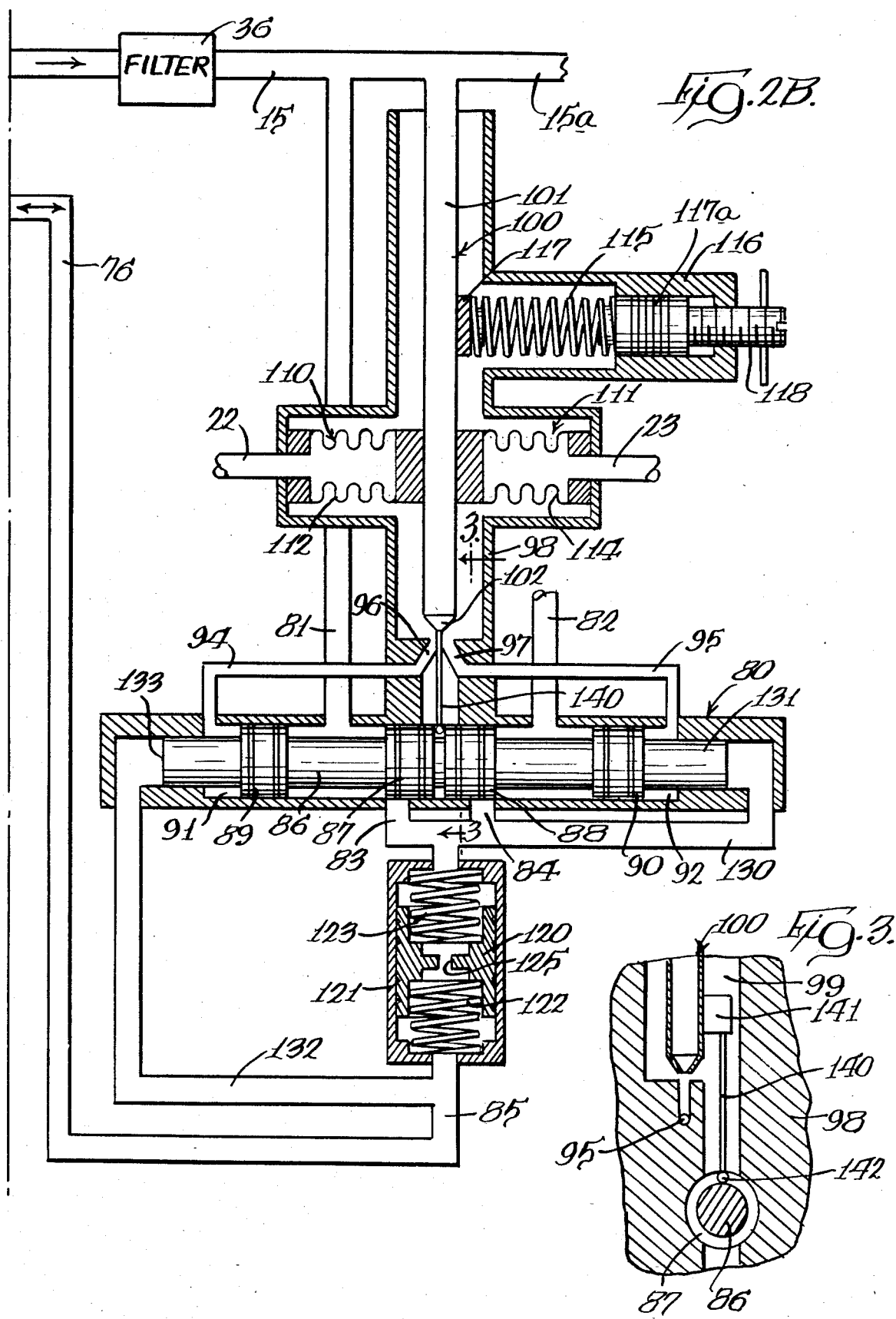

DUAL PUMP CONTROLS

DESCRIPTION

1. Technical Field

The present invention relates generally to a control for controlling the delivery of a liquid, such as engine fuel, from two fixed displacement pump sources, such as provided by a dual element pump.

2. Background Art

Dual element pumps have been developed to satisfy particular use requirements, with one requirement being that encountered in supplying fuel to an engine of a high performance military aircraft. In such a system, the amount of mechanical power dissipated in the fuel should be minimized in order to minimize the temperature rise of the fuel. Examples of such dual element pumps and various controls are shown in the Huber et al U.S. Pat. Nos. 3,953,153 and 4,102,606, owned by the assignee of this application. It has been found that the previous controls have resulted in oscillatory, low-accuracy, control of the delivery from the pumps with significant problems in the transition between single and dual element operation.

The Coar U.S. Pat. No. 2,780,172 discloses a dual fuel pump with controls which utilizes first and second stage regulating valves for controlling the flow from two pump sources. The operation in Coar is dependent upon very high gain first and second stage regulating valves and the dynamic stability of typical installations would limit the gain of the valves to a value much lower than that implied in the Coar patent.

The Coar control, when using physically realizable gains, would not provide for a stepless transition from single to dual pump operation or from dual to single pump operation. For a stepless transition, the second stage regulating valve would have to start coming off its seat at the same time that the check valve connecting the first stage to the discharge started contacting its seat. For variable pump speed operation, this is not possible.

DISCLOSURE OF THE INVENTION

A primary feature of the invention disclosed herein is to provide controls for two fixed displacement pump sources which maintains one pump source depressurized until it is needed, thereby minimizing power dissipation and which provides for a stepless transition between single or dual pump source operation. Additionally, the control is by the use of a high gain, compensated integral arrangement to provide delivered fuel flow with high accuracy, good stability, and quick response to changes in flow demand. A head sensor is used as part of the control to greatly reduce the interaction between the pump controls and long pressure sense lines which sense the pressure difference indicative of fuel flow and deliver a pressure difference signal to the controls.

In carrying out the foregoing, the pump control has a modulating valve with first bypass means for bypassing fluid from a delivery line connected to one of the pump sources and with the outlet of the second pump source being selectively connectable to the delivery line by means of a passage through the modulating valve. The modulating valve has a pair of valve lands, with one controlling the first-mentioned bypass means and the other controlling the passage through the modulating valve. A second bypass means bypasses the output flow from the second pump source when a valve land of the modulating valve prevents flow through said passage to the delivery line. Means are provided for establishing the discharge pressure of the second pump source at a pressure slightly greater than that in the delivery line prior to the second valve land opening the modulating valve passage. With this construction, the control of the transition between single and dual pump operation is determined by the physical positioning of a single valve member, namely the valve member of the modulating valve.

The establishment of the discharge pressure of the second pump source prior to delivering fluid from the second pump source to the delivery line is accomplished by the use of a pressure regulating valve connected in the second bypass means which bypasses the output flow from the second pump source until such time as all the output flow from the first pump source is utilized. The pressure-regulating valve is normally openable at a relatively low pressure and is selectively urged closed by the higher pressure in the delivery line, prior to opening of the passage in the modulating valve, by positioning of a toggle valve which is positioned responsive to the position of the modulating valve member. With this construction, fuel from the second pump source can be bypassed back to pump inlet, with minimal resistance through the pressure-regulating valve and with the pressure being built up at least equal to that in the delivery line prior to directing fuel from the second pump source to the delivery line. This results in minimizing power dissipation and provides for a stepless transition from single pump operation to dual pump operation or vice versa.

The position of the modulating valve member is controlled through the use of a head sensor associated with a flow control valve, with the head sensor including a jet pipe connected to the fuel delivery line and having a nozzle with a null position, positioned midway between a pair of inlets to a pair of pilot lines leading to pilots at opposite ends of the flow control valve. The jet pipe is movable from the null position in response to a pressure difference across an opening in a fuel control deviating from a set point. The jet pipe, when moved, acts to shift the flow control valve from a null position to connect a fluid line to a pilot at the modulating valve to either a source of pressure or to a return line for corresponding positioning of the modulating valve. The connection from the flow control valve to the pilot of the modulating valve has dynamic compensator means associated therewith for sensing flow in said line to provide a feedback pressure signal acting to move the flow control valve toward a null position. Additionally, a feedback spring is connected between the valve member of the flow control valve and the jet pipe for balancing the force exerted by the pressure difference signal which exceeds said set point to return the nozzle to the null position. Means are provided for varying the set point responsive to the temperature of the fuel being pumped. The use of the head sensor greatly reduces the interaction between the pump controls and long pressure sense lines extending between the location at which the pressure difference is sensed and the pump controls. The dynamic compensator means provides a high gain, compensated integral control to assist in providing a fuel flow with high accuracy, good stability, and quick response to changes in flow demand.

BRIEF DESCRIPTION OF THE DRAWINGS

FIG. 1 is a block diagram of an engine fuel supply system;

FIG. 2A is a schematic view of a portion of the pump control and which associates with the structure shown in FIG. 2B along the line indicated to the right of the Figure;

FIG. 2B is a schematic view of a portion of the control and which associates with the showing in FIG. 2A along the line appearing at the left side of the Figure; and FIG. 3 is a fragmentary view, taken generally along the line 3—3 in FIG. 2B.

BEST MODE FOR CARRYING OUT THE INVENTION

The control has been shown and described in association with two fixed displacement pump sources which are the sources provided by a dual element pump, with the liquid being pumped being engine fuel delivered to a fuel control for an engine. It will be understood that the two pump sources could be provided by two commonly driven separate pumps and that the system could be used with a liquid other than engine fuel and, thus, references to "fuel" and "dual element pump" are for the purpose of describing the structure disclosed herein and are not intended to exclude use of equivalent structure for handling of other pumped liquids.

The fuel supply system for supplying an engine, such as an aircraft engine, is shown diagrammatically in FIG. 1 wherein a dual element pump, indicated generally at 10, is connected to a line 11 extending to a boost pump. The two pump sources of the dual element pump are shown as directing fuel to a dual element pump control, indicated generally at 12, through a pair of fluid lines including a delivery line 15 from one pump source and a line 16 from the other pump source. Bypass flow returned to the inlet side of the dual element pump flows through a line, indicated diagrammatically at 17. The delivery line 15, 15a continues on to the fuel control, indicated generally at 20, and fuel flows from the fuel control 20 to an engine through a fluid line 21. The fuel control can be a standard fuel metering valve which has a valve member settable to vary the area of an opening through which the fuel can flow and, thus, set the fuel rate to the engine and with there being a pressure drop across this variable area which can be sensed to obtain a differential pressure. The differential pressure sense lines extending from the fuel control back to the duel element pump control are indicated at 22 and 23.

Referring particularly to FIG. 2A, the dual element pump 10 has pumps 10a and 10b, defining the two pump sources. The dual element pump 10 has a casing 25 in which a rotor 26 rotates and which has generally radially-extending vanes 27 which travel through first and second pump chambers defined by the opposite ends of a generally oval chamber 28 in which the rotor rotates. The vanes are caused to move outwardly to follow the surface of the oval chamber and, in their rotative travel in a clockwise direction as viewed in FIG. 2A, successively sweep past a fluid inlet 29 and a fluid outlet 30 of the first pump 10a and a fluid inlet 31 and a fluid outlet 32 of the second pump 10b.

Reference may be made to the previously-mentioned Huber et al patents for a more detailed disclosure of dual element pumps.

The fuel supply line 11 connects to a boost pump (not shown) for supplying fuel to the dual element pump and, as shown in FIG. 2A, is defined by lines 11a and 11b which connect to lines 11c and 11d, respectively, connected to the pump inlets 29 and 31. The flow from pump outlet 30 of the first pump 10a is through the previously mentioned delivery line 15 and through a check valve 35 and a filter 36 and with a portion of the line 15 being identified at 15a in FIG. 2B extending on to the fuel control 20.

The flow from the first pump 10a is the primary flow through the fuel control 20 to the engine. The rate of flow from pump outlet 30 is controlled by a modulating valve, indicated generally at 40, which has a movable valve member 41. The rate of flow to the engine can be less than the full output from the first pump 10a as controlled by first bypass means including a fluid line 42 extending from the delivery line 15 to an end of the modulating valve and a fluid line 43 extending from the modulating valve and having a branch 43a which connects with the line 11c leading to the pump inlet port 29. The amount of fuel flowing from fluid line 42 to fluid line 43 is controlled by a valve land 44 of the valve member 41 which defines part of the first bypass means and by its position relative to the valve port for the fluid line 43.

The flow from the second pump 10b is to the line 16 which connects to a line 45 having a check valve 46 therein and which extends to the modulating valve 40. The line 45 can communicate with the fuel delivery line 15 through a passage in the modulating valve 40 and a line 47 extending from the modulating valve to the delivery line 15. This passage is shown closed in FIG. 2A by a land 48 of the modulating valve member 41. Shift of the modulating valve member 41 toward the left, as viewed in FIG. 2A can open the passage to permit flow from the pump outlet port 32 to the fuel delivery line 15. The dimensioning of the lands 44 and 48 on the modulating valve member 41 is such that the land 44 will completely close the first bypass means including lines 42 and 43 before the land 48 moves to a position to open the passage connecting the fluid line 45 to the line 47.

In the position of the modulating valve member 41 shown in FIG. 2A, the fluid from the pump outlet port 32 is bypassed by second bypass means back to the pump inlet port 31. This bypass means includes a conduit 50 connected to the line 16 and extending to a pressure regulator valve, indicated generally at 51. The pressure regulator valve 51 has a valve member 52 urged to a closed position by a spring 53 to close communication between the conduit 50 and a line 54 connected to the line 11d leading back to the fluid inlet port 31. The set point of the pressure regulator valve is determined by the force of the spring 53 and the pressure acting on the back shown in FIG. 2A, the pressure acting on the back side of the valve member 52 is equal to boost discharge pressure, since a line 55 connected to the back side of the pressure regulator valve and which extends to an outlet of a toggle valve, indicated generally at 56, is in communication with the line 43, connected to an inlet of the toggle valve branch line 43a and line 11a connected to boost discharge pressure. The total force created by boost discharge pressure and the spring 53 is relatively small whereby the piston 52 of the pressure regulator valve may readily open to permit bypass flow back to the pump inlet port 31.

When flow through the delivery line 15 in excess of that deliverable by the flow from pump outlet port 30 is required, the modulating valve member 41 is caused to shift toward the left, as viewed in FIG. 2A, by part of the control to be described. This shift results in the first bypass means being closed by the valve land 44, the land 44 opening a line 60 extending between the delivery line 15 and the modulating valve and a land 61 of the valve member closing a line 62 leading to the inlet of the boost pump. This causes fluid under pressure to flow through the modulating valve to a pilot line 64 leading to the left-hand end of the toggle valve 56, as seen in FIG. 2A, which causes a valve member 65 of the toggle valve to shift to the right from the position shown. This causes a valve land 70 to block communication between the line 43, extending from the modulating valve, and the line 55, extending to the back side of the pressure regulator valve. Shift of a valve land 70a opens communication of the line 55 to a line 66 extending from a toggle valve inlet to the modulating valve 40 and which is in continuous communication with the line 47 extending between the modulating valve and the delivery line 15. As a result, fuel at delivery line pressure is directed to the back side of the pressure regulating valve whereby the force holding the valve member 52 of the pressure regulating valve closed results from delivery line fluid pressure as well as the force of the spring 53. This sets the discharge pressure of the fluid in line 16 from the pump outlet 30 at a pressure slightly higher than the pressure in the delivery line because of the force exerted by spring 53. After the pressure of the fluid from the second pump 10b has been increased, further movement of the valve member 41 causes the valve land 48 to open the passage to the delivery line 15. The land 48 regulates the volume of fuel delivered by the second pump 10b.

The toggle valve 56 is controlled in its position by pilot means including the land 70 on the toggle valve member 65 selectively subject to delivery line pressure through the pilot line 64 and an opposite end of the valve member which is selectively subjected to boost inlet pressure by a line 71 which connects to an end of the toggle valve and to the line 43. As will be evident, the position of the toggle valve 56 is determined by the position of the modulating valve 40. When the modulating valve member 41 shifts to the left from the position shown in FIG. 2A, pressure is increased in the pilot line 64 extending to an end of the toggle valve member 65 and, when above a threshold level, the toggle valve member 65 shifts to the right. The pressure in pilot line 64 must fall significantly below this threshold level before the toggle valve member will shift back to the left. This prevents the pressure in line 55 acting on the back side of the pressure regulator valve member 52 from intermittently cycling between the relatively high pressure in the fuel delivery line and the pressure in the first bypass means near the location at which the modulating valve member 41 shifts to change the connection of line 43 to either line 42 or line 60 leading into the modulating valve.

The modulating valve member 41 is urged toward the left, as viewed in FIG. 2A, by a spring 74 and the position of the modulating valve member is controlled by opposed fluid pilots responsive to fluid pressures. acting on opposite ends thereof, as more fully described hereinafter. These pressures act upon an end of the land 44 and upon an end of a larger diameter land 75 at the opposite end of the modulating valve member. The end of the land 44 is subject to the pressure which exists in a chamber at an end of the modulating valve, while the land 75 is subject to a control pressure which reaches the modulating valve through a pilot line 76 which is shown continuing into the control portion illustrated in FIG. 2B.

The position of the modulating valve member 41 is controlled by a flow control valve, indicated generally at 80 in FIG. 2B. The flow control valve 80 is connected to a source of fluid under pressure and, as shown, this connection is to the fuel delivery line 15 by a line 81. There is also a connection to a return line 82 leading to boost discharge and a pair of connections 83 and 84 to a line 85 which connects to the pilot line 76 extending to the modulating valve 40. A flow control valve member 86 has a pair of lands 87 and 88 which, together with lands 89 and 90, control the communication of the line 85 through connections 83 and 84 to either of the pressure line 81 or the return line 82, with this communication being blocked when the valve member is positioned as shown in FIG. 2B.

The position of the flow control valve member 86 is controlled by a pair of pilots associated therewith including pilot chambers 91 and 92 to which the outer ends of the valve member lands 89 and 90 are exposed to form pilot pistons. The respective pilot lines 94 and 95 extend from the pilot chambers 91 and 92 and have their respective inlets 96 and 97 terminating adjacent each other within a casing 98 having an internal chamber 99.

A head sensor having a jet pipe, indicated generally at 100, is operable to apply a differential signal to the pilot chambers of the flow control valve 80 for shifting of the valve member 86 from the position shown. The jet pipe 100 is of a two-piece construction with an upper, flexible part 101 being an isolation tube made of material such as stainless steel when the liquid being pumped is jet fuel. A tip 102 is made of hardened steel for erosion resistance and has an opening at its lower end defining a nozzle. The jet tube 100 connects to the delivery line 15 whereby fuel is delivered through the nozzle. With the jet pipe in a null position, as shown in FIG. 2B, there is equal pressure in each of the pilot lines 94 and 95 whereby the flow control valve member is in a null position. Assuming the jet pipe, acting as a cantilever beam, is flexed in a direction to have the nozzle move to the right, as shown in FIG. 2B, there will be an unbalance in pressure in the two pilot lines, with the higher pressure being in the pilot line 95 whereby the flow control valve member 86 is caused to shift to the left and, as a result, the connection 84 opens to the return line 82, while the line 81 having fluid pressure is blocked. When the jet pipe is flexed to the left, the greater pressure would be in the pilot line 94 whereby the flow control valve member 86 would shift to the right and the fluid pressure source line 81 would be connected to the connection 83 for delivery of fuel under pressure thereto. The chamber 99 is suitably connected to a return line whereby fuel delivered from the nozzle can be returned to a source of fuel for the pump.

The jet pipe is positioned by the pressure difference established in the fuel control 20, as previously described and, thus, by a signal responsive to a pressure differential. More particularly, two pressure-expandable actuators, indicated generally at 110 and 111 are positioned, one at each side of the jet pipe 100, and are of a suitable construction to vary in length depending upon the pressure existing within a flexible element of the actuator, with such elements being identified at 112 and 114. The pressure-expandable actuator 110 is connected to the high pressure signal line 22 previously described, while the pressure-expandable actuator 111 is connected to the low pressure signal line 23. The set point for the pressure difference at the fuel control 20 which establishes a null position for the jet pipe 100 is set by an adjustable spring construction including a spring 115 in a housing element 116 and having a member 117 at an end thereof which abuts against the jet pipe 100. The force of the spring 115 can be varied by varying the location of an element 117a which abuts an end of the spring 115 and is variably positioned by rotation of a threaded member 118 engaging the outer end of the element 117a. The set point is also varied as a function of fuel temperature and, thus, fuel density, by the element 117a which is a stack of bimetallic washers, with a tailored coefficient of thermal expansion. With this element being exposed to the temperature of the fuel, it can vary in over-all length by expansion and contraction of the washers to provide compensation in the set point, dependent upon temperature of the fuel.

When the pressure differential at the fuel control 20 increases beyond the set point, there is a shift of the jet pipe nozzle 102 to the right, as previously described, with the result that the flow control valve member 86 can shift to the left. This connects pilot line 76 to the return line 82 and fuel can flow from the pilot chamber of modulating valve 40 whereby pressure acting against the end of the modulating valve land 44 shifts the modulating valve toward the right to increase the first bypass means including the lines 42 and 43. When the pressure differential signal is below the set point, the nozzle 102 shifts to the left to cause the flow control valve member 86 to shift to the right whereby fluid pressure is directed to the connection 83 and by operation of compensator means to be described fluid flows through pilot line 76 to the modulating valve 40 to cause the modulating valve member 41 to shift to the left in a direction to close the first bypass means. Dependent upon the signal pressure delivered to the modulating valve 40, the first bypass means can be completely closed and, as previously described, the second pump is then cut into the delivery line to deliver fuel at a pressure at least equal to or geater than that existing in the fuel delivery line.

The line 85 extending from the flow control valve 80 includes dynamic compensator means to effect a proportional plus integral control into the positioning control of the modulating valve member 41. This means includes a piston 120 movable within a casing 121 and spring-urged to a central position by a pair of springs 122 and 123 acting oppositely on the piston 120. The piston has an orifice 125 through which fuel flows. The control signal delivered through pilot line 76 to modulating valve 40 is derived from downward movement of the piston 120 and flow through orifice 125 when connection 83 is connected to line 81.

A first pilot line 130 is connected to the top side of the piston 120 and to an end of the flow control valve 80 to act on an end 131 of the flow control valve member 86. The lower side of the piston is connected by a pilot line 132 to an opposite end of the flow control valve member to act on an end 133 of the flow control valve member 86. When the flow control valve member 86 shifts to the right, as previously described, fuel from line 81 would flow to the top of the piston 120 increasing the pressure at the top of the compensator piston pushing it down and, at the same time, flow passes through the orifice 125 to the line 76 leading to the modulating valve 40. There is an increase of pressure at the top of the compensator piston which is directed through the pilot line 130 to the end 131 of the flow control valve member 86 to provide a feedback force tending to move the valve member back to a null position. This would overcome a lower force applied through pilot line 132 to the end 133 of the flow control valve member 86. In addition to flow through the orifice 125, the downward movement of the piston 120 causes displacement of the volume of fuel that has acted through pilot line 76 to shift the modulating valve member 41 to the left. Without an orifice in the piston 120, the modulating valve member 41 would move in direct relation to the movement of the piston 120. With the orifice, the flow control valve member 86 does not return all the way to a null position and the flow through the orifice causes movement of the modulating valve member 41 beyond that resulting solely from displacement of the piston 120. This feedback to the opposite ends of the flow control valve member 86 provides a dynamic compensation to the action of controlling the fuel delivery from the pumps providing for a very responsive, stable controlled action.

A feedback spring 140, shown particularly in FIG. 3, has an upper end fixed to the jet pipe 100, as shown at 141, and a lower end 142 captured between the lands 87 and 88 of the flow control valve member 86. As the nozzle 102 of the jet pipe shifts from the null position and as the flow control valve member 86 moves, the feedback spring 140 exerts a force on the jet pipe 100 just balancing the force due to the differential pressure signal applied to the jet pipe 100 to return the jet pipe to a null position.

In start-up of the system, the spring 74 of the modulating valve holds the modulating valve member 41 in a position to block the first bypass means and thus place the system in a maximum flow position from both pumps for start-up. When the pressure differential of the fuel control is less than the set point, spring 115 associated with the head sensor, is operative to cause the flow control valve to direct pressure to the modulating valve 40 to assist in positioning the valve member 41 to the left of the position shown in FIG. 2A. As the pressure difference of the fuel control exceeds the set point, the head sensor would operate through the steps described to operate the part of the control shown in FIG. 2A to bring the pressure difference at the fuel control into regulation.

At the initiation of start-up, the toggle valve member 65 could be in any position. This valve member should snap to the high pressure position, namely, to the right as shown in FIG. 2A, upon start-up. If necessary, a slight bias spring could be added to the toggle valve to urge the toggle valve member to the high pressure position. At the initiation of start-up, the pressure regulator valve 51 should be closed, regardless of the position of the toggle valve. This will port all of the pump flow from pumps 10a and 10b to the fuel control 20 during the first part of start-up. As the system pressure rises, the toggle valve should snap to the high pressure position, if not previously in that position, and the pressure regulator valve 51 will be regulating, because of the system pressure being delivered through the lines 47 and 66 to the back side of the pressure regulator valve. As the pressure differential of the fuel control exceeds the set point, the head sensor will bring the system into regulation and so long as the flow from the second pump 10b is not required, the first bypass means will be operative and the greater pressure applied through the pilot line 71 will act on the toggle valve member 65 to shift it to the left whereby the force required to open the pressure regulator valve is minimal and pump flow from the second pump 10b can be bypassed.

The invention described herein provides a method of sequencing and controlling the flow delivered from two commonly-driven pump sources, such as a dual element positive displacement pump, so as to maintain a constant pressure differential as measured from two sense lines originating in the main fuel control 20. For a decrease in the pressure differential at the fuel control, the pump control must increase the flow delivered to bring the pressure differential signal back to normal. For an increase in the differential pressure signal, the pump control must decrease the flow to bring the signal back to normal. The pressure differential signal is measured across the variable area fuel metering valve contained in the fuel control 20. A drop in the signal corresponds to an increase in metering valve area while an increase in metering valve area corresponds to an increase in fuel demand by the fuel control. By holding the pressure drop across the metering valve constant, a very accurate control of fuel flow is effected. The pump sources, such as the dual elements of the pump, are of the fixed positive displacement type and, as such, deliver fuel flow proportional to their rotational speed only. The pump control functions to sense the flow demanded by the fuel control and to bypass back to the pumps that portion of the flow that is not needed.

I claim:

1. A pump control for controlling the delivery of fuel from two fixed displacement pump sources to a device comprising, a delivery line from one pump source to said device, first bypass means connected to said delivery line including a modulating valve having a movable valve member with a valve land positionable to control the rate of flow from the delivery line through the first bypass means, means selectively connecting the second pump source to said delivery line including a passage through the modulating valve which is either opened or closed by a second valve land of the movable valve member through which fuel may flow from the second pump source to the delivery line, and second bypass means for bypassing the output flow from the second pump source when said second valve land prevents flow to the delivery line, and means for establishing the discharge pressure of the second pump source at a pressure slightly greater than that in said delivery line prior to said second valve land opening the modulating valve passage.

2. A pump control as defined in claim 1 wherein said bypassing means for flow from the second pump source includes a conduit, and said means for establishing the discharge pressure of the second pump source includes a pressure-regulating valve movable to a position to close said conduit and urged toward a closed position by the discharge pressure of the first pump source.

3. A pump control as defined in claim 2 including: a toggle valve having a first inlet connected to said first bypass means, a second inlet connected to said passage through the modulating valve, an outlet connected to said pressure-regulating valve and a valve member movable to connect one or the other of the inlets to said outlet; and pilot means for said toggle valve operable by said modulating valve to shift said toggle valve to connect the second inlet to said outlet prior to said second valve land opening the modulating valve passage.

4. A pump control as defined in claim 1 including means responsive to a pressure differential established at said device responsive to a rate of fuel flow at the device for positioning said modulating valve.

5. A pump control as defined in claim 4 wherein the modulating valve has opposed fluid pilots for positioning thereof, a flow control valve having a movable valve member and connections to said delivery line and to a return line and a fluid connection to one of the fluid pilots for the modulating valve, said flow control valve having fluid pilots adjacent opposite ends thereof and a pair of fluid lines connected one to each of said last-mentioned pilots and having their inlets adjacent each other, a jet pipe connected to said delivery line and having a nozzle opening towards said adjacent inlets and having a null position in which the nozzle is centered between said adjacent inlets, means for moving said jet pipe from its null position when said pressure differential varies from a set point to unbalance the pressures in said flow control valve fluid pilots to move the flow control valve member from a null position and connect said one of the fluid pilots of the modulating valve to either the fluid pressure in the delivery line or the return line to change the position of the modulating valve, and the other fluid pilot of the modulating valve being connected to said delivery line, said fluid pilots of the modlulating valve each including an end of the modulating valve member and the end exposed to pressure by the flow control valve having a larger area.

6. A pump control as defined in claim 1 wherein said second bypass means for flow from second pump source includes a conduit, said means for establishing the discharge pressure of the second pump source includes a pressure-regulating valve movable to a position to close said conduit and urged toward a closed position by the discharge pressure of the first pump source, a toggle valve having a first inlet connected to said first bypass means, a second inlet connected to said passage through the modulating valve and an outlet connected to said pressure-regulating valve, and a valve member movable to connect one or the other of the toggle valve inlets to said outlet, pilot means for said toggle valve operable by said modulating valve to shift said toggle valve to connect the second inlet to said outlet prior to said second valve land opening the modulating valve passage, and means responsive to a pressure differential established at said device responsive to a rate of fuel flow at the device for positioning said modulating valve.

7. A pump control for controlling the delivery of liquid from two fixed displacement pump sources, comprising, a delivery line from one pump source, first bypass means for delivering liquid from said delivery line back to an inlet for the pump sources including a modulating valve having a movable valve member with a valve land positionable to control the rate of flow from the delivery line through the first bypass means, means selectively connecting the second pump source to said delivery line including a passage through the modulating valve which is either opened or closed by a second valve land of the movable modulating valve member, and second bypass means for bypassing the output flow from the second pump source back to the inlet of said pump sources when said second valve land prevents flow to the delivery line, a pressure-regulator valve for establishing the discharge pressure of the second pump source at a higher pressure than that in said delivery line prior to said second valve land opening the modulating valve passage, a toggle valve for selectively applying the pressure in the delivery line to said pressure-regulator valve, and flow control valve means operable in response to the rate of flow in the delivery line for positioning the modulating valve member.

8. A pump control for controlling liquid fuel delivery from two fixed displacement pump sources to a fuel line comprising, a modulating valve connected into the fuel line downstream of said two fixed displacement pump sources and having means for bypassing flow from the fuel line and which has fluid pilots for positioning thereof comprising, means for establishing a pressure difference indicative of fuel flow from the pump source, a flow control valve having a movable valve member and connections to a source of fluid pressure and to a return line and a fluid connection to one of the fluid pilots for the modulating valve, said flow control valve having fluid pilots adjacent opposite ends thereof and a pair of pilot lines connected one to each of said last-mentioned pilots and having their inlets adjacent each other, a jet pipe connected to said fuel line and having a nozzle opening towards said adjacent pilot line inlets and having a null position in which the nozzle is centered between said adjacent pilot line inlets, means for moving said jet pipe from its null position when said pressure difference varies from a set point to unbalance the pressures in said flow control valve fluid pilots to move the flow control valve member from a null position and connect said one of the fluid pilots of the modulating valve to either said source of fluid pressure or the return line to change the position of the modulating valve.

9. A pump control as defined in claim 8 including a feedback spring connected between the movable valve member of the flow control valve and the jet pipe for balancing the force exerted by said pressure difference which exceeds said set point to return said nozzle to the null position.

10. A pump control as defined in claim 8 including means for varying said set point responsive to the temperature of the fuel being pumped.

11. A pump control as defined in claim 8 including dynamic compensator means in the fluid connection between the flow control valve and said one pilot of the modulating valve which senses flow in said last-mentioned fluid connection from the flow control valve and provides a feedback pressure signal acting to move the flow control valve toward a null position.

12. A pump control as defined in claim 11 wherein said dynamic compensator means includes a movable piston with an orifice, and a pair of pilot lines connected to said fluid connection at opposite sides of the orifice and one to each of the opposite ends of the flow control valve to act on the flow control valve member.

13. A pump control as defined in claim 11 wherein said means for moving the jet pipe from its null position includes a pair of pressure-expandable actuators engageable with opposite sides of the jet pipe, said means for establishing a pressure difference indicative of fuel flow comprises a fuel control with a variable opening in the fuel line, and a pair of fluid lines connected to the fuel line at opposite sides of the last-mentioned opening and one to each of said pressure-expandable actuators.

14. A pump control for controlling liquid fuel delivery from two fixed displacement pump sources to a fuel delivery line comprising, a first bypass means connected to said fuel delivery line including a modulating valve having a movable valve member with a valve land positionable to control the rate of flow from the fuel delivery line through the first bypass means, means selectively connecting the second pump source to said fuel delivery line including a passage through the modulating valve which is either opened or closed by a second valve land of the movable valve member, and second bypass means for bypassing the output flow from the second pump source when said second valve land prevents flow to the delivery line, means for establishing the discharge pressure of the second pump source at a pressure slightly greater than that in said fuel delivery line prior to said second valve land opening the modulating valve passage, said modulating valve having fluid pilots for positioning thereof, means for establishing a signal indicative of fuel flow from the pump source, a flow control valve having a movable valve member and connections to a source of fluid pressure and to a return line and a fluid connection to one of the fluid pilots for the modulating valve, said flow control valve having fluid pilots adjacent opposite ends thereof and a pair of pilot lines connected one to each of said last-mentioned pilots and having their inlets adjacent each other, a jet pipe connected to said fuel delivery lines and having a nozzle opening toward said adjacent pilot line inlets and having a null position in which the nozzle is centered between said adjacent inlets, means for moving said jet pipe from its null position in response to said signal to unbalance the pressures in said flow control valve fluid pilots to move the control valve member from a null position and connect said one of the fluid pilots of the modulating valve to either said source of fluid pressure or the return line to change the position of the modulating valve.

15. A pump control as defined in claim 14 including a feedback spring connected between the movable valve member of the flow control valve and the jet pipe for returning said nozzle to the null position.

16. A pump control as defined in claim 14 including dynamic compensator means in the fluid connection between the flow control valve and said one pilot of the modulating valve which senses flow in said fluid connection from the flow control valve and provides a feedback pressure signal acting to move the flow control valve toward a null position.

17. A pump control for controlling liquid delivery from two fixed displacement pump sources to a delivery line comprising a modulating valve connected to the delivery line and having means operable to bypass flow from the delivery line and selectively direct liquid from one pump source to the delivery line and having fluid pilots for positioning thereof, means for establishing a pressure difference indicative of flow from the pump source, a flow control valve having a movable valve member and connections to a source of fluid pressure and to a return line and a fluid connection to one of the fluid pilots for the modulating valve, said flow control valve having fluid pilots adjacent opposite ends thereof and a pair of pilot lines connected one to each of said last-mentioned pilots and having their inlets adjacent each other, a jet pipe connected to said delivery line and having a nozzle opening towards said adjacent pilot line inlets and having a null position in which the nozzle is centered between said adjacent inlets, means for moving said jet pipe from its null position when said pressure difference varies from set point to unbalance the pressures in said flow control valve fluid pilots to move the control valve member from a null position and connect said one of the fluid pilots of the modulating valve to either said source of fluid pressure of the return line to change the position of the modulating valve.

18. A pump control as defined in claim 17 wherein said means for moving the jet pipe from its null position includes a pair of pressure-expandable actuators engageable with opposite sides of the jet pipe, said means for establishing a pressure difference indicative of liquid flow comprises a variable opening in the delivery line, and a pair of fluid lines connected to the delivery line at opposite sides of the last-mentioned opening and one to each of said pressure-expandable actuators.

19. A pump control as defined in claim 17 including dynamic compensator means having an orificed piston in the fluid connection between the flow control valve and said one pilot of the modulating valve which senses flow in said fluid connection from the flow control valve and provides a feedback pressure signal acting to move the flow control valve toward a null position.

20. A pump control as defined in claim 17 including a feedback spring connected between the movable valve member of the flow control valve and the jet pipe for balancing the force exerted by said pressure which exceeds said set point to return said nozzle to the null position.

21. A pump control for controlling the delivery of liquid from two fixed displacement pumps, comprising, a delivery line from one pump, first bypass means for deliverying liquid from said delivery line including a modulating valve having a movable valve member with a valve land positionable to control the rate of flow through the first bypass means, means selectively connecting the second pump to said delivery line including a passage through the modulating valve which is either opened or closed by a second valve land of the modulating valve member through which fuel may flow from the second pump source to the delivery line, and second bypass means for bypassing the output flow from the second pump when said second valve land prevents flow to the delivery line including a pressure regulator valve, and means for varying the setting of the pressure regulator valve to increase the discharge pressure of the second pump to that in said delivery line prior to said second valve land opening the modulating valve passage.

* * * * *